United States Patent Office.

LEANDER R. STREETER, OF CHELSEA, ASSIGNOR TO HIMSELF AND A. B. ELY, TRUSTEES,) OF NEWTON, MASSACHUSETTS.

*Letters Patent No. 89,254, dated April 20, 1869.*

IMPROVED PROCESS OF TREATING PYROXYLE, PYROXYLINE, AND THE LIKE SUBSTANCE, FOR FORMING USEFUL AND ORNAMENTAL ARTICLES.

The Schedule referred to in these Letters Patent and making part of the same.

Be it known that I, LEANDER R. STREETER, of Chelsea, in the State of Massachusetts, have discovered or invented certain new and useful Processes for Treating Pyroxyle, Pyroxyline, Soluble Gun-Cotton, or Xyloidine, and its compounds, and for forming articles of ornament, utility, and manufacture therefrom, of which the following is a full description:

The nature of my discovery or invention consists in forming articles of ornament, utility, and manufacture from pyroxyle, or pyroxyline, or xyloidine, (or vegetable fibre rendered soluble by the action of chemical reagents,) or its compounds, by a second process, following the treatment of the same with and after the evaporation of its solvents, (whereby it is made hard and horny,) said second process being the rendering the dried or hardened pyroxyle or pyroxyline yielding, extensible and impressible, by the action of fluids, which only distend without dissolving the pyroxyle or pyroxyline, (or which may soften or dissolve the materials compounded with the pyroxyle or pyroxyline,) such as alcohol, sulphide of carbon, naphtha, chloroform, or any other suitable fluid which is volatile, either spontaneously, or by heat, or other means, and is not a solvent of pyroxyline, employing in this second process, and after the action of fluids which are non-solvents of pyroxyle or pyroxyline, suitable cements to render the whole homogeneous and solid, or to bring it into any desired permanent form, when necessary.

It is well known that pyroxyle or pyroxyline has not only been extensively used in solution for many purposes in surgery and the arts, but has been variously compounded and utilized in the peculiarly flexible and horny condition in which it is left by the evaporation of most of its etherial solvents, especially that of sulphuric ether.

But all these processes begin and end with the use of the first solvent. If the materials are reused, it is only by repeating the first process.

The serious difficulties attending the large extension of this remarkable and valuable material into articles of manufacture, are its powerful shrinkage, the exceeding volatility of its etherial solvents, and the absolute non-adhesibility of its dried surfaces, upon which heat has no material softening effect.

These difficulties in the direct action of a solvent must continue until some more manageable menstruum is found for it.

I find, however, by employing a second process, and different fluids, the embarrassments attending the first process may be overcome, and pyroxyline in the hard or dried state may be adapted to nearly all, if not all, the purposes hitherto sought for it with the use of etherial solvents.

And this process consists not in rendering it fluid or plastic, or otherwise affecting it by solvents, but by employing such fluids as will only penetrate its pores, and distend the whole, or such as will not only distend it, but soften or dissolve the bodies compounded with it, whereby it becomes yielding and impressible, and the materials compounded with it are also rendered adhesible, or cements may be combined with it, as stated above.

By this process, the pyroxyle or pyroxyline, or its compounds, may be compelled into any permanent form with great facility, and without the risk of failure, such as attends the use of its etherial solvents.

Where the pyroxyle or pyroxyline, hardened in a pure state, (by first dissolving it in an etherial menstruum, and evaporating the same,) is used, say, to manufacture ladies' bracelets, or other jewelry, or manufactures similarly manipulated, the hard material being brought into a flat, round, or other shape, and ornamented, polished, and finished, or not, as may be desired, is immersed in alcohol, or other proper non-solvent of pyroxyle or pyroxyline, for from ten to fifteen hours, more or less, according to the thickness of the material.

It can now be bent into the desired shape with the utmost ease, and being secured in its position until the alcohol or other non-solvent is evaporated, it is permanently formed.

Or to give the pure, hard pyroxyle or pyroxyline, made as stated above, any kind of solid homogeneous form, it may be disintegrated to any required degree, then immersed in alcohol, sulphide of carbon, naphtha, chloroform, or other suitable non-solvent of pyroxyle or pyroxyline, for from ten to fifteen hours, more or less, according to its degree of disintegration, then thoroughly intermixed with any suitable cementive body, either in liquid or powdered form, and brought into the required shape by spontaneous formation, as by pouring it upon flat or irregular surfaces, or into moulds, or by compression in moulds or dies, or in moulds acting as dies, or, if intermixed with a powdered cement, then by pouring upon flat or irregular surfaces, or into moulds, and applying heat, or into dies, or into moulds acting as dies, and applying compression with heat.

In such cases, the pyroxyle or pyroxyline, being distended, as stated above, may be compelled into harmonious shapes from its acquired yielding, distensible, compressible, and impressible qualities or conditions, and made permanently thus shaped by the added cement.

Or to give to pyroxyle or pyroxyline (when compounded with any other materials whatsoever, and hardened, as above described) any kind of round, flat, or irregular solid homogeneous form, it may be treated either in the manner above described for making ladies' bracelets, &c., or be disintegrated and manipulated as described in the treatment of the same with cementive bodies.

But where it is desired to form solid articles, varying in thickness, and requiring pressure without the use of a cementive agent, the pyroxyle or pyroxyline, or its compounds, after being dissolved and dried, must be subjected to the action of a non-solvent, as before given, and then shaped up by compression in moulds or dies, or in moulds acting as dies.

It would be desirable, however, that the prepared material, in this case, should approximate to the general form of the article to be made, and be in a single piece, inasmuch as no ordinary pressure would unite its surfaces, and it is not truly (or indefinitely) plastic.

Where, however, the added material of the compound is lac, copal, or any other resinous body, or wax, rubber, stearine, or any substance upon which sulphide of carbon, or other common solvent will act, but which is a non-solvent of pyroxyle or pyroxyline, then the cementive agent will be found in the compound, if in the right proportion, and no other need be used.

For examples, to manufacture any solid and homogeneous body used in dentistry:

The mode described for ladies' bracelets, &c., would suffice, where the article to be made could be compelled into the required form by simply bending, or by moderate force, and there passively secured until the distending and perhaps softening fluid or non-solvent of pyroxyle or pyroxyline was evaporated.

But where the distended or prepared material must be compelled into irregular shapes and proportions by compression, then either moulds or dies, or moulds acting as dies, must be employed, and a cementive agent to be found in the compound itself, or one must be intermixed, and the process pursued which is adapted to either condition, with or without heat, as given above; or it may be formed in the manner described for treating a single piece of the material, prepared by my second process.

The foregoing directions will embrace about every mode of use to which the process herein given can be adapted.

It cannot well be used to any general advantage in a very thin condition. Nor can a distended semi-solid piece of pyroxyle or pyroxyline, or its compounds, be well compelled into all indefinite forms, as a soft and plastic body can.

But in the semi-solid distended state produced by my second process, it can be compelled into an indefinite variety of useful and permanent shapes, and where it is mixed with or made a cementive body, in the manner described, it has all the scope of any soft, plastic material, and is as readily and reliably controlled.

It should be stated, that while it is desirable that the etherial solvents employed in the first process should be entirely evaporated, yet no serious inconvenience would result in the second process if a small portion remained; but to commence the treatment by my second process, before the first evaporation was nearly or quite perfected, would tend to reduce the strength of the hardened pyroxyle or pyroxyline, or its compounds.

The toughness of hardened pyroxyle or pyroxyline, or its compounds, is perfected by the solvent action of sulphuric ether, and its thorough evaporation afterwards.

Any fluid which absorbs or expels the sulphuric ether from the pyroxyline, weakens it to just the degree it is so absorbed or expelled.

I desire to add that the distending agency of the fluids in the second process only extends to the cellular expansiveness of the hardened pyroxyle or pyroxyline, or its compounds.

The hardened or dried pyroxyle or pyroxyline, (or its compounds,) is, in a cellular state, made thus by the infinitesimal spaces left by the evaporated sulphuric ether and alcohol, and the distending fluids I use only expand these minute cells.

There is a limit, therefore, to the distention, but the distention affords the yielding, compressible, and impressible capacities, of which I avail myself in my second process of treatment, as herein described.

If it retained its rigid, horny qualities, it would be of too difficult compressibility to readily adapt itself to required forms; but, treated by my second process, it may be easily compelled into other shapes, or impressed with various designs, or rolled out into thinner sheets, or otherwise altered in figures; or by the use of a suitable cement, it may be attached to other materials or bodies, the methods to be pursued being found in the preceding specifications.

Where vulcanite rubber, or pyroxyle or pyroxyline, or its compounds, (whether in the form of collodion or otherwise,) or any other solid, soft, plastic, or fluid material or body, is now used in the arts, or manufactured into various shapes, whether by spontaneous formation upon flat or irregular horizontal surfaces, or by moulding without compression, or shaping by compression in dies, or moulds acting as dies, or by adhesion to other bodies or materials, by the interposition or aid of a cement, and where heat is or is not employed, the modes of manipulation hereinbefore described will suffice to adapt my new process for treating pyroxyle or pyroxyline, or its compounds, to like use in the arts, or manufactured articles, and in any new uses to which my new process for treating pyroxyle or pyroxyline, or its compounds, may be adapted, the foregoing specifications will be a sufficient guide to any one of skill and capacity to manage or work the same.

That is, if vulcanite rubber, prepared pyroxyle or pyroxyline, or its compounds, or other material, for which my second process, as herein described, is a desirable substitute, is now poured, rolled, or packed in any manner, upon horizontal surfaces, or into moulds, or in dies, or in moulds acting as dies, or otherwise, the same course is to be pursued under this new and second process, and in whatever manner it may now or hereafter be desirable to employ my aforesaid second process, the manipulations given in the foregoing will be a sufficient guide in the use of pyroxyle or pyroxyline, or its compounds, in the place of other and similarly-adaptable substances, the same being applied in any mode that is known and desirable.

I do not confine myself to any particular compounding of pyroxyle or pyroxyline, nor to the use of any particular cement, or cementive body, but claim, broadly, any compounds, or the use of any cementive agents, when the same are prepared and treated according to my new and second process, substantially as herein set forth.

If not sufficiently expressed in the foregoing specifications, I will here add that the final operation, in all uses of pyroxyle or pyroxyline, or its compounds, by my new second process, is the evaporation of the fluids from the material by heat or otherwise, the temperature employed usually not exceeding 220°.

The time required to complete the evaporation will depend upon the thickness of materials, or the articles produced, and the degree of temperature employed.

What I claim, is—

1. Treating pyroxyle, pyroxyline, or xyloidine, or its compounds, with suitable non-solvents, substantially as and for the purposes set forth.

2. Treating pyroxyline, or its compounds, with suitable non-solvents and cementive agents, substantially as and for the purposes set forth.

3. Pyroxyline, or xyloidine, or soluble gun-cotton, and its compounds, treated with suitable non-solvents, substantially as described.

4. Pyroxyline, and its compounds, treated with suitable non-solvents and cementive agents, substantially as described.

5. The formation of articles of ornament, utility, and manufacture from pyroxyle or pyroxyline, and its compounds, rendered yielding, distensible, compressible, and impressible by a second process, substantially as set forth.

6. The formation of articles of ornament, utility, and manufacture, by rendering pyroxyle or pyroxyline, or its compounds, yielding, distensible, compressible, impressible, and adhesive, by a second process, substantially as set forth.

7. The attaching of pyroxyle or pyroxyline, or its compounds, to other materials, articles, or bodies, after the said pyroxyle, &c., has been treated by my second process, substantially as set forth.

LEANDER R. STREETER.

Witnesses:
ALICE E. STREETER,
ANNIE STREETER.